April 29, 1952 J. B. RETALLACK 2,594,495

MAGNETIC RECORDING SYSTEM FOR CALL DATA IN AUTOMATIC TELEPHONY

Filed Sept. 4, 1947 8 Sheets-Sheet 1

INVENTOR
J. B. RETALLACK
BY P. C. Smith
ATTORNEY

April 29, 1952 J. B. RETALLACK 2,594,495

MAGNETIC RECORDING SYSTEM FOR CALL DATA IN AUTOMATIC TELEPHONY

Filed Sept. 4, 1947 8 Sheets-Sheet 2

INVENTOR
J. B. RETALLACK
BY P. C. Smith
ATTORNEY

MAGNETIC RECORDING SYSTEM FOR CALL DATA IN AUTOMATIC TELEPHONY

INVENTOR
J. B. RETALLACK
BY P. C. Smith
ATTORNEY

MAGNETIC RECORDING SYSTEM FOR CALL DATA IN AUTOMATIC TELEPHONY

Filed Sept. 4, 1947 8 Sheets-Sheet 4

INVENTOR
J. B. RETALLACK
BY P. C. Smith
ATTORNEY

April 29, 1952 J. B. RETALLACK 2,594,495

MAGNETIC RECORDING SYSTEM FOR CALL DATA IN AUTOMATIC TELEPHONY

Filed Sept. 4, 1947 8 Sheets-Sheet 5

INVENTOR
J. B. RETALLACK
BY P. C. Smith
ATTORNEY

MAGNETIC RECORDING SYSTEM FOR CALL DATA IN AUTOMATIC TELEPHONY

Filed Sept. 4, 1947 8 Sheets-Sheet 6

INVENTOR
J. B. RETALLACK
BY P. C. Smith
ATTORNEY

April 29, 1952 J. B. RETALLACK 2,594,495

MAGNETIC RECORDING SYSTEM FOR CALL DATA IN AUTOMATIC TELEPHONY

Filed Sept. 4, 1947 8 Sheets-Sheet 7

INVENTOR
J. B. RETALLACK
BY P. C. Smith
ATTORNEY

MAGNETIC RECORDING SYSTEM FOR CALL DATA IN AUTOMATIC TELEPHONY

Filed Sept. 4, 1947 8 Sheets-Sheet 8

INVENTOR
J. B. RETALLACK
BY P. C. Smith
ATTORNEY

Patented Apr. 29, 1952 2,594,495

UNITED STATES PATENT OFFICE 2,594,495

MAGNETIC RECORDING SYSTEM FOR CALL DATA IN AUTOMATIC TELEPHONY

John B. Retallack, New York, N. Y., assignor to Bell Telephone Laboratories, Incorporated, New York, N. Y., a corporation of New York Application September 4, 1947, Serial No. 772,091

10 Claims. (Cl. 179—7.1)

This invention relates to a telephone system for enabling calling subscribers to control the establishment of toll connections by dialing and in which system signals of different frequency combinations are recorded on a magnetic recorder in accordance with the data required for billing a toll call and in which system the information recorded on the magnetic recorder may be transmitted to a receiving circuit arranged to produce a card or other record containing the billing data for use in an accounting machine. The invention relates more particularly to improvements in a system of the general type disclosed in my Patent No. 2,447,533, granted August 24, 1948.

In the system of my patent referenced above, a group of automatic ticketing trunks is provided, each trunk having a ticket printer. A subscriber desiring a connection to a line terminating in an office in the nearby toll area dials the office code and numerical digits of the wanted line number and in response to the dialing of one or more of the office code digits a connection is extended to an idle one of the ticketing trunks which have access to the office in which the wanted line terminates. Immediately following the seizure of an idle trunk, an idle sender common to the ticketing trunks is associated with the seized trunk. The sender is provided with registers for registering the digits of a called line number dialed by the calling subscriber and with registers for registering the digits of the calling line number, which number can be supplied to said sender by an associable identifier.

As soon as the first digit has been registered in the sender, which digit may be either the third office digit, the thousands digit or the hundreds digit, an idle identifier is associated with the sender over an identifier connector and the identifier is associated directly with the trunk over an identifier trunk connector. Thereupon, the identifier reconstructs the office code dialed by the calling subscriber, which information may be derived from the trunk or from the trunk and sender and transmits this information to the sender. The identifier also proceeds to identify the calling line and to transmit information concerning the designation digits of such calling line to the sender.

The sender after registering the digits of the wanted line number transmitted to it from the identifier and the digits of the wanted number dialed into the sender from the calling line, proceeds to direct the setting of selector switches to extend a connection from the ticketing trunk to the wanted subscriber's line. Such called office code and numerical registrations are also effective to control the printer of the trunk to print on the toll ticket, the office code and numerical digits which identify the called line. In addition, the resignations of the office code and numerical digits of the calling line transferred to the sender from the identifier are effective to control the printer to print such digits on the toll ticket. Provision is also made for printing other data required for ticketing the call such as the date and time the call was made and the elapsed time of the conversation.

One object of the present invention is to further improve an automatic ticketing system of the type above described and particularly to improve the ticketing trunk whereby a magnetic recording unit is controlled by the sender and the trunk to record thereon the previously mentioned billing data.

Another object of the present invention is to record such data on such a magnetic recorder by means of utilizing combinations of alternating current frequencies to represent digits of such data and impressing such frequencies upon a magnetic tape in said recorder.

It is a further object of the invention to provide receiving circuits at a central accounting office controlled by said trunk for seasonably enabling said recorder to transmit the recorded data to said circuits to be there converted from combinations of alternating frequencies to digits of data for the purpose of producing a card or other record containing such data and usable in well-known types of accounting machines.

Other advantages and objects of the invention will be apparent to those skilled in the art from the subsequent detailed description of one embodiment of the invention. This description is augmented by the drawings forming a part of the disclosure, of which drawings the following are general descriptions of the various figures comprising same.

Fig. 1 shows a calling subscriber's line, the schematic representation of a line finder and first, second and third selector switches over which access may be had to an idle one of a plurality of automatic ticketing trunks, one of which is partly disclosed in Figs. 2, 3 and 4;

Figs. 2, 3 and 4 taken together show sufficient parts of a ticketing trunk for the purpose of explaining the invention and including a duration of conversation register and a magnetic recorder;

Fig. 4 discloses schematically certain parts of one of a plurality of link circuits connectable between the trunk and a register with associated accounting apparatus in a central accounting office;

Figures 1, 9:
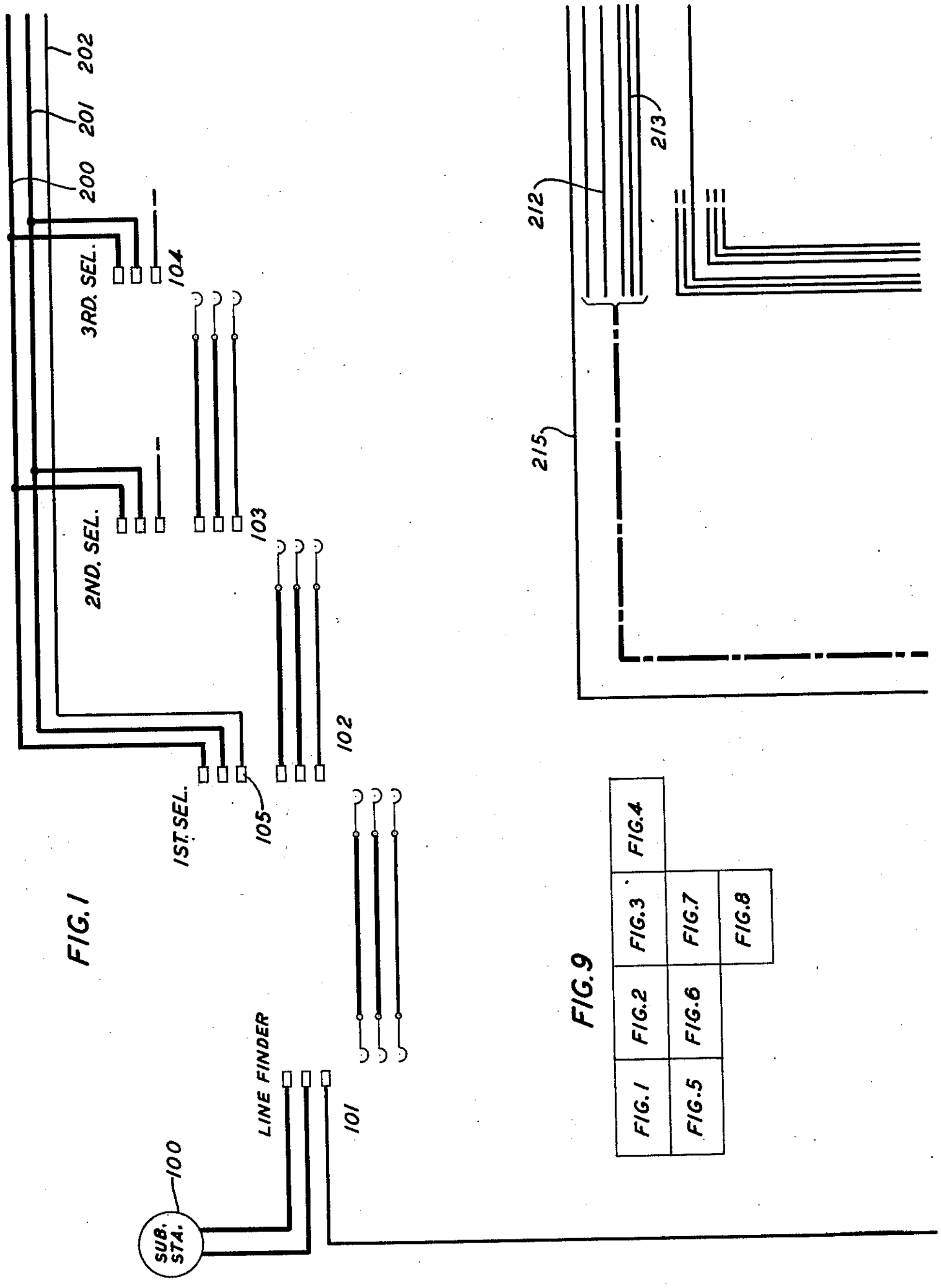
Fig. 9 shows an arrangement of Figures 1 through 8 such that the assembled group of figures as a whole discloses an automatic ticketing system embodying the present invention.
Figure 2:
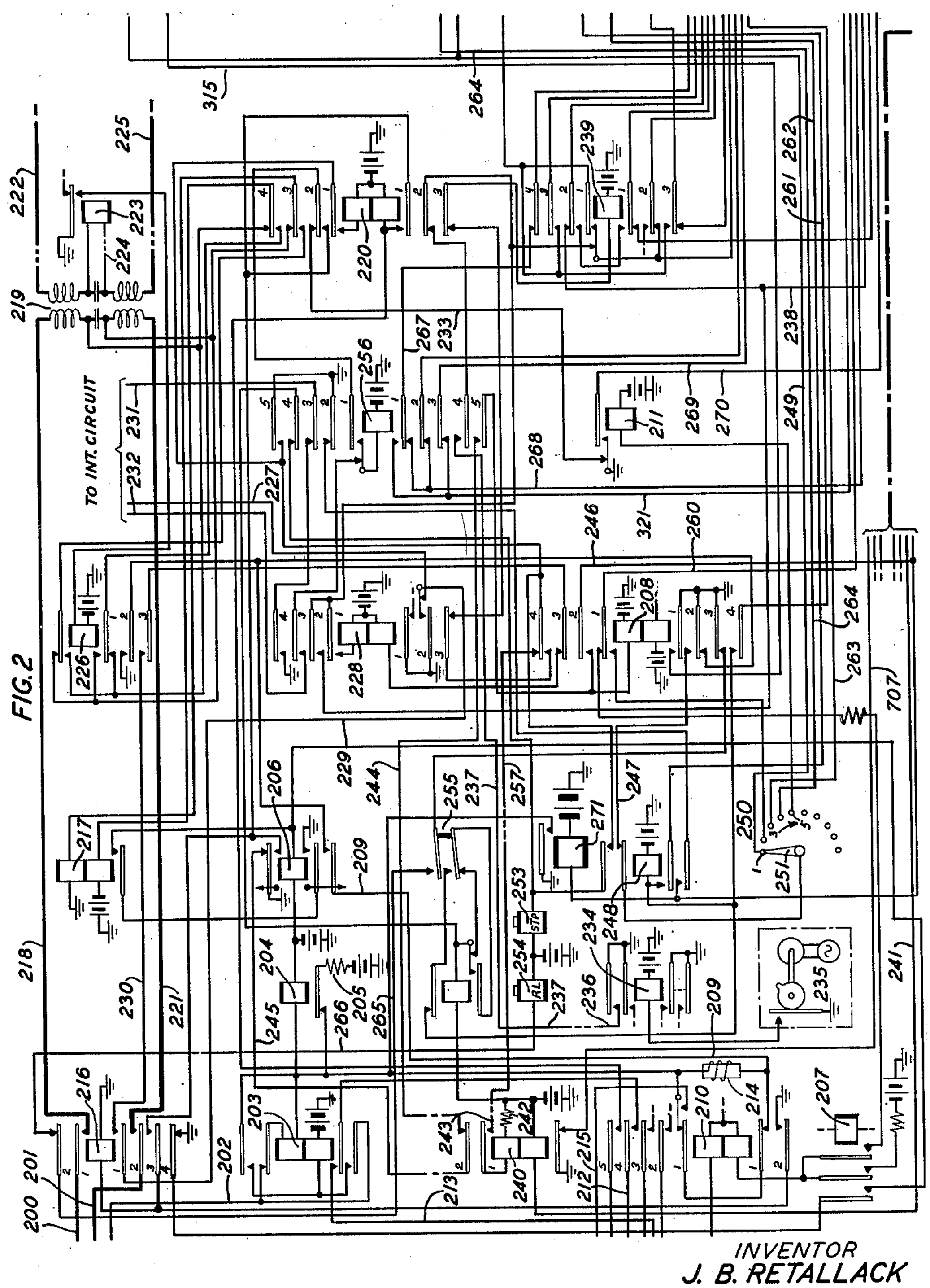
Figure 3:
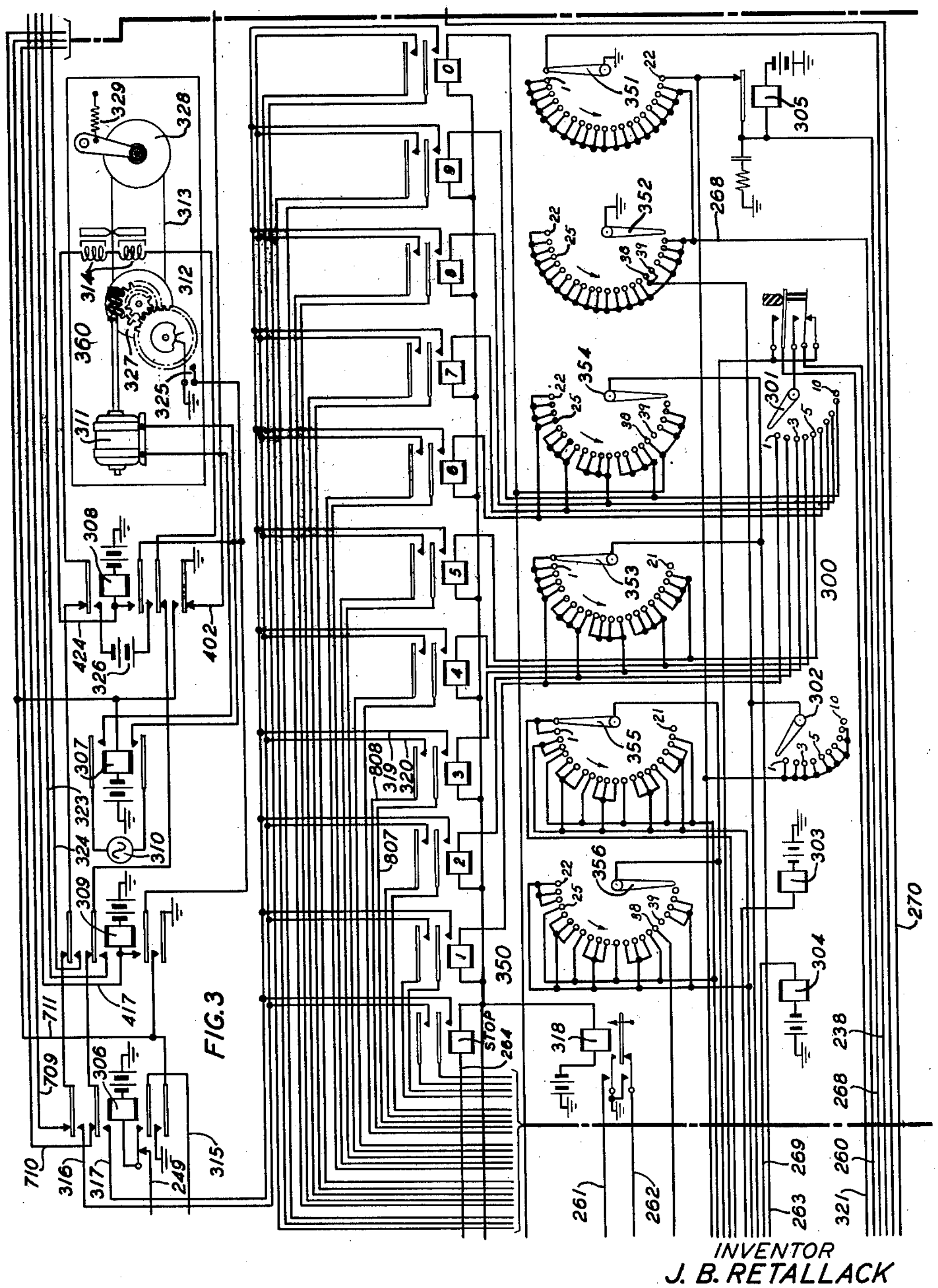
Figure 4:
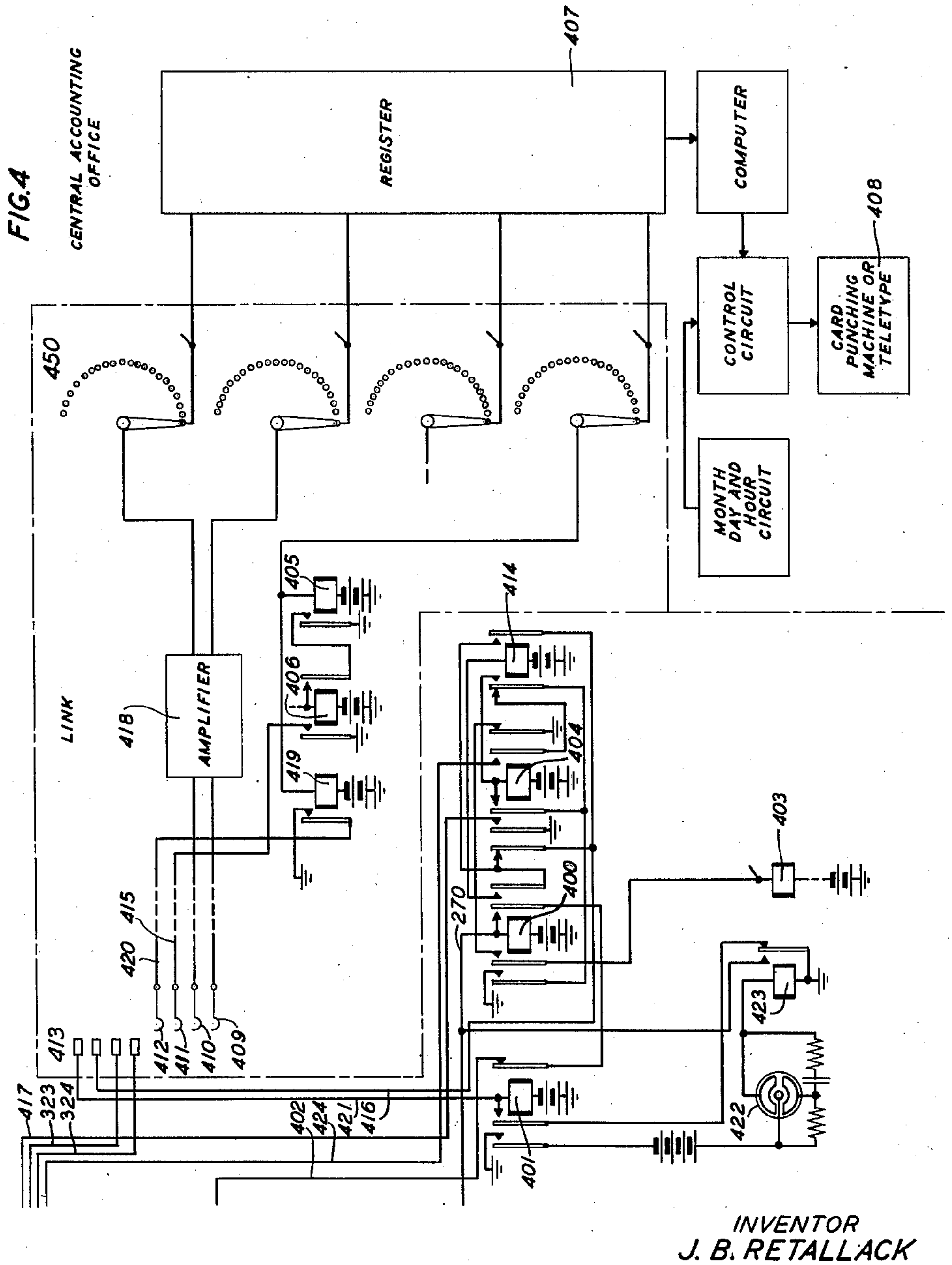

The line finder 101 and the selector switches 102, 103 and 104 of Fig. 1 are of the well-known step-by-step type and the selector switches are operative in response to the dial of a calling line to establish local connections or to establish a connection with an idle automatic ticketing trunk, such as is disclosed partly in Figs. 2, 3 and 4, should the subscriber desire a connection to a subscriber's line which terminates in the toll area adjacent to the exchange area in which the calling line terminates. As disclosed, the ticketing trunk of Figs. 2, 3 and 4 has a branch which terminates in the bank of a first selector 102, another branch which terminates in the bank of a second selector 103, and still another branch which terminates in a bank of a third selector 104 whereby the trunk may be seized in response to the dialing of the first office code digit of a certain distant office, in response to the dialing of the first and second office code digits of another office and in response to the dialing of the three office code digits of still another office.

The elapsed time registers 300 and 350 and the elapsed time progress switch 250 associated with the ticketing trunk and the progress switch 650 of the sender are of the well-known rotary step-by-step type. The brush 251 of the progress switch 250 is advanced step by step in response to the operation of the stepping magnet 253 and is restored by the operation of release magnet 254. The brushes 301 and 302 of register 300 are advanced step by step by stepping magnet 303 and are restored by release magnet 304 and the brushes of register 350 and progress switch 650 are advanced step by step from their normal positions and are returned to their normal positions by a further forward stepping movement.

The ticket recording mechanism 360 associated with the automatic ticketing trunk comprises a magnetic tape 313 operable by drums 327 and 328 and kept taut by means of spring 329, a gear train 312 for rotating said drums when said gear train is operated by a motor 311 and a combination magnetizing, pick-up and wipe-out coil 314.

Two trunk finders of the step-by-step double brush set type are individualized to each sender. One of such trunk finders is schematically disclosed in Fig 5. Each of the trunk finders has access to the terminals in which control conductors from one hundred ticketing trunks terminate.

Figure 7:
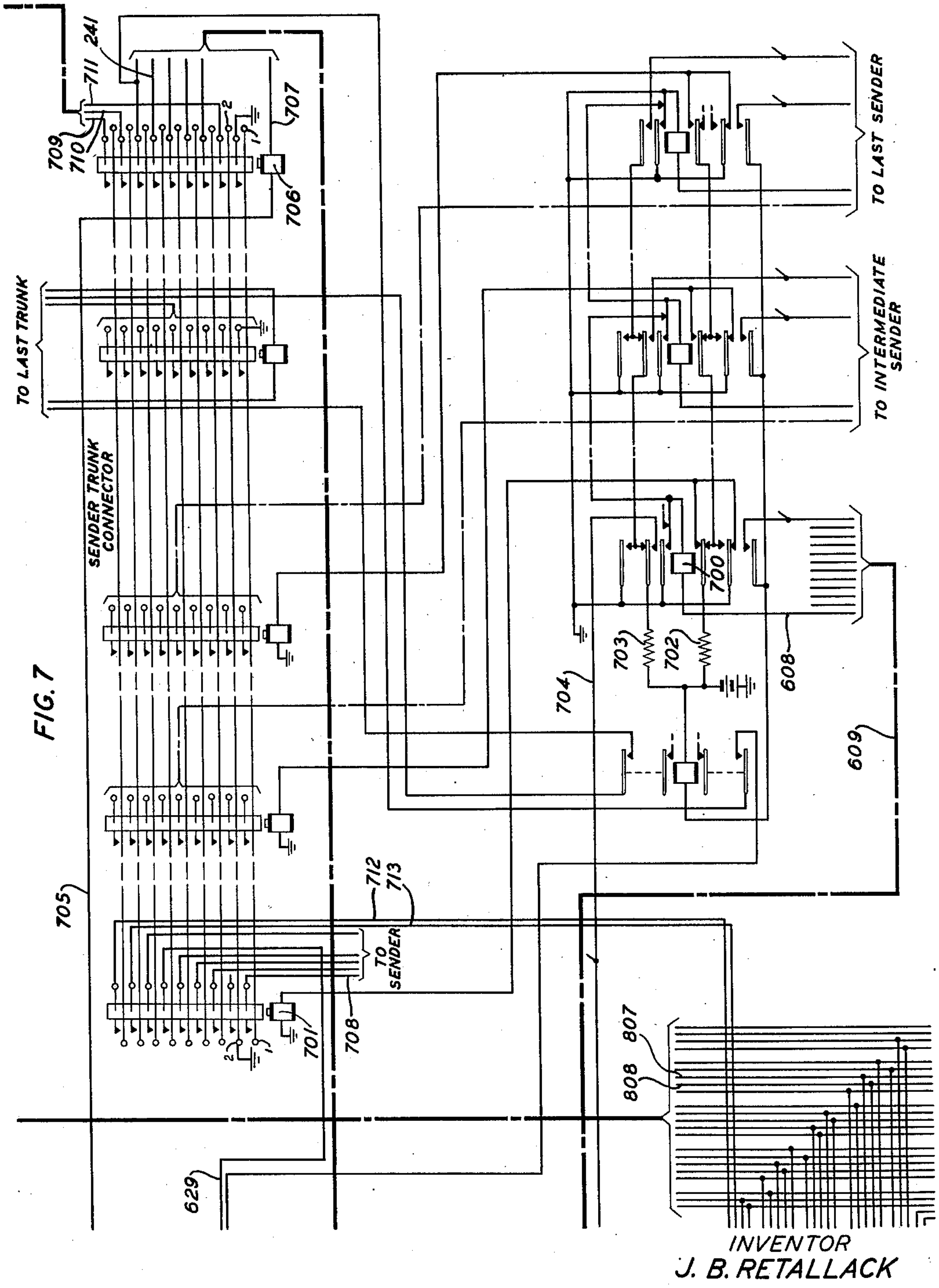
Fig. 7 shows a sender-trunk connector for connecting any seized sender with the ticketing trunk which has seized said sender.

Since a trunk finder does not have sufficient brushes in both of its brush sets to accommodate all of the control conductors required between a trunk and a sender, a plurality of additional sender-trunk connector circuits is provided, that shown in Fig. 7 having a multicontact relay individual to each sender and ten multicontact relays individual respectively to ten trunks. Ten of such circuits serve the above said group of one hundred trunks to which the trunk finder of Fig. 5 has access.

Figure 6:
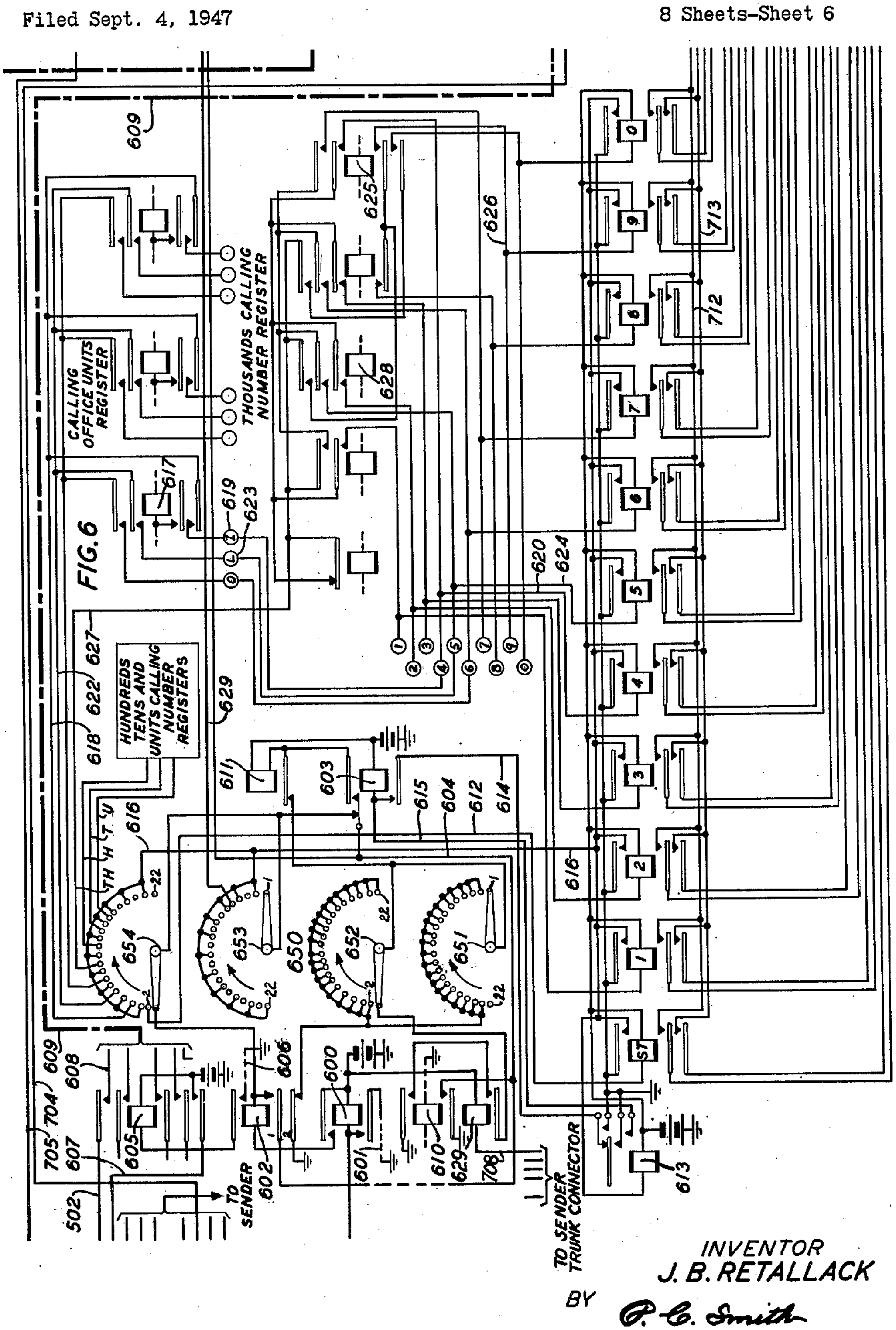
Fig. 6 shows sufficient parts of a sender to enable an understanding of the present invention.

Only so much of one of the senders is disclosed as is deemed necessary for a complete understanding of the invention, only two of the registers of the sender being partly disclosed in Fig. 6 and the circuits, among others, for controlling out-pulsing being omitted. The month, day and hour circuit and identifier have been disclosed only diagrammatically as they are concerned only incidentally with the present invention. For a full disclosure of the entire system to which the present invention is applicable, reference may be had to my Patent No. 2,447,533 hereinbefore referred to, and to the copending application of J. W. Gooderham, Serial No. 448,782, filed June 27, 1942.

To more clearly set forth the novel features of the invention, it will first be assumed that the party whose substation is identified by the numeral 100 in Fig. 1, initiates a call for a toll connection to a subscriber's line terminating in an office of a toll area to which the calling subscriber is permitted access by dialing. Upon the removal of the receiver from the switchhook, an idle line finder having access to the calling line, such as the line finder 101, is started in search of the calling line in a well-known manner. When the line finder has found the calling line the usual dial tone is transmitted over the calling line to inform the subscriber that his line has been connected with a first selector 102, paired with the line finder 101, and that he may therefore commence dialing the digits of the wanted line number.

It will be assumed that the calling subscriber desires a connection with a line whose directory number is MAR–1345 and a ticketing trunk over which the connection may be extended may be reached from the sixth level of the bank of first selector 102. The calling subscriber upon hearing the dial tone therefore proceeds to dial the office code letters M, A, R and the numerical digits 1, 3, 4 and 5. In response to the dialing of the first office code letter M, which has a numerical equivalent 6, the first selector 102 is operated to elevate its brush set to a position opposite the sixth bank level and to then hunt over the terminals of this level in search of an idle ticketing trunk. It will be assumed that the trunk disclosed in Figs. 2, 3 and 4 is idle and that therefore when the test or sleeve brush of selector 102 engages the test or sleeve terminal 105 of the branch of this trunk, it finds no busy ground potential thereon and therefore the selector seizes the trunk. A circuit is thereupon effective from ground at the selector over the sleeve conductor 202 of the trunk, through the upper normal contacts and upper winding of sleeve relay 203, through the winding of relay 204 and in parallel therewith over the back contact of relay 204 and through resistance 205 to battery and ground. Relay 203 operates from the low resistance battery thus supplied, locks from battery through its lower winding and over its lower front contact to the sleeve conductor 202, opens the initial operating circuit through its upper winding, connects its lower winding over its upper and lower front contacts in parallel with the winding of relay 204, and prepares a circuit over its inner lower front contact for a purpose to be later described. Relay 204 also operates and removes resistance 205 from the parallel connection with its winding. As soon as the talking circuit is cut through at the selector 102, (not shown) is established for slow-to-release relay 206 and ground is connected to the trunk start conductor which is common to the ten trunks of a subgroup and establishes a connection from ground and battery through the winding of relay 207 to a conductor which marks the trunk as calling so that the started trunk finder will stop on the terminals of such trunk. Relay 206, upon operating, connects ground over the lower No. 2 back contact of relay 208, the lower front contact of relay 206, conductor 209, over the inner No. 1 normal contacts of relay 210, the upper contacts and through the lower winding of sleeve relay 203 to battery for holding the sleeve relay operated after ground is removed at the selector 102, and over the lower contacts of relay 203 to sleeve conductor 202 of the trunk to hold the selector 102 and the line finder 101 from releasing. Relay 206 will remain operated during the opening of the loop circuit caused by open line impulses of dialed digits or characters.

When the trunk finder seizes the terminals of the calling trunk and completes the previously mentioned circuit for relay 207, relay 207 operates and locks to a ground supplied from the trunk finder and at a later time from the selected sender. Relay 207 holds relay 206 operated over the circuit extending over the outer contacts of relay 207 and to ground at the lower No. 4 contact of relay 216. If there is no idle sender available relay 207 will not operate and relay 206 will therefore release and in doing so will effect the release of sleeve relay 203, relay 204, line finder 101 and first selector 102. If, as we assume, an idle sender is found then relay 207 operates as above and the dialing circuit of the line loop is transferred to the selected sender which will receive the second office code designation.

Figure 5:
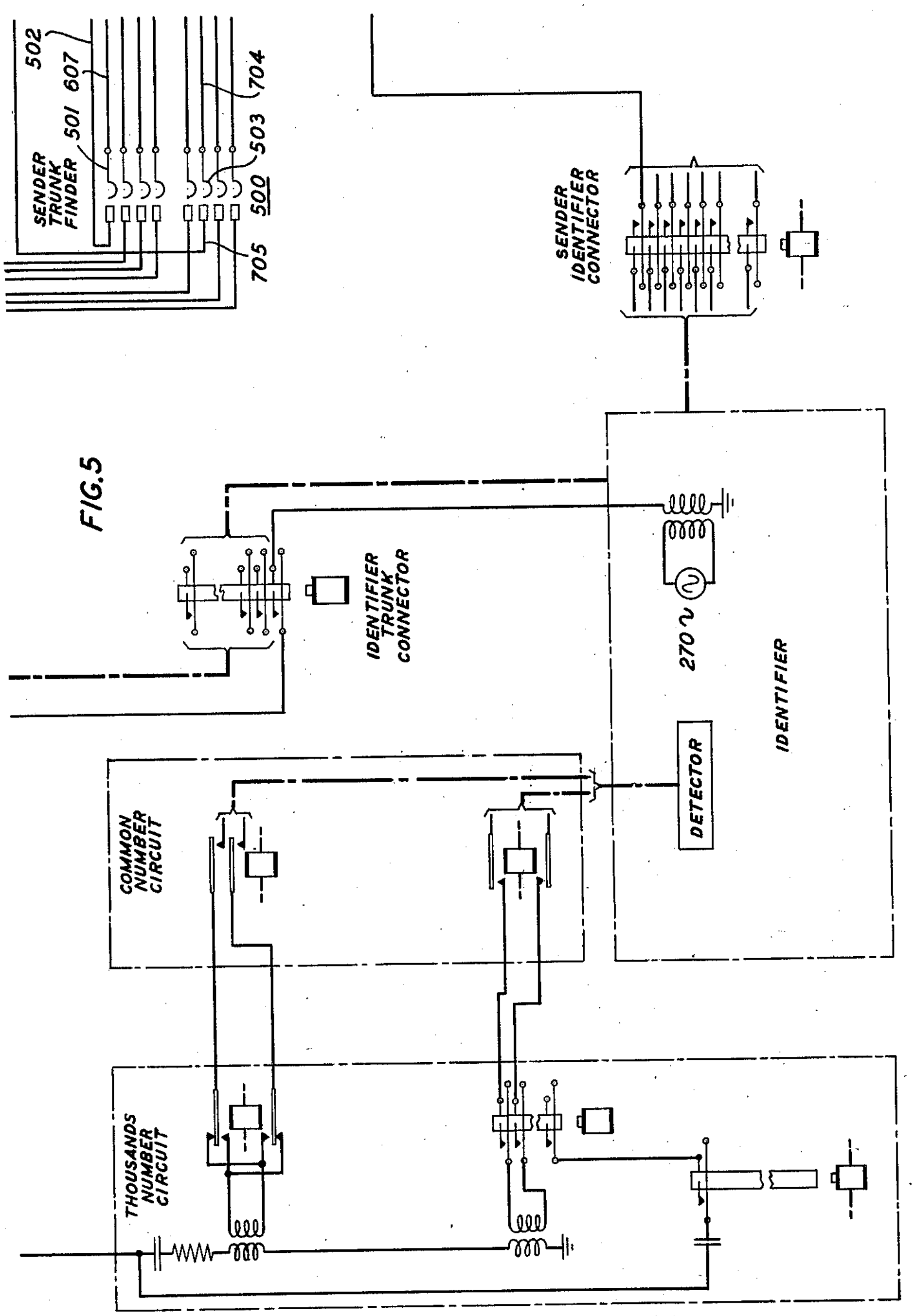
Fig. 5 shows schematically parts of an identifier circuit associable with the subscriber's line of Fig. 1, with the trunk of Figs. 2, 3 and 4 and with a sender, partly disclosed in Fig. 6.

When the first digit (the third office code designation dialed by the calling subscriber) has been received in the sender an idle identifier is associated with the sender by means of a sender-identifier connector (Fig. 5) and the identifier is associated with the calling ticketing trunk by an identifier trunk connector circuit (Fig. 5). The operations of the identifier circuits need not be described in detail herein for an understanding of the features of the present invention. Identifier circuits and the functions thereof which are pertinent to the operation of a system capable of embodying the present invention are fully disclosed in the copending application of J. W. Gooderham Serial No. 448,782, filed June 27, 1942. General reference only is made to the identifier shown schematically in Fig. 5 in connection with its cooperation with the trunk, the sender and the calling line. Upon the operation of the identifier trunk connector a circuit is established for the three-position polarized relay 210 of the trunk, relay 210 thereby operating its upper contacts to complete extension of control conductors from the trunk to the sender.

A circuit is at this point established which may be traced in part from battery applied at the identifier over contacts of the identifier trunk connector, thence over conductor 212, the upper No. 4 contacts of relay 210, over the inner lower contacts of sleeve relay 203, code lead 213 and contact of the identifier trunk connector to the identifier for registering in the identifier the first code digit dialed to set the selector 102 and a further circuit is established to transfer the second code digit assumed to be registered in the trunk to the identifier. If the first digit registered in the sender was the third code digit, as it has been assumed, then this digit is transferred to the identifier from the sender. The identifier then has all of the information required to reconstruct the called office code dialed by the subscriber. After the reconstruction of the office code digits of the called office, this information is transmitted from the identifier to the sender and registered in the sender as fully described in application, Serial No. 448,782, hereinbefore referred to. Relay 210 at its upper No. 1 back contact opens the shunt around retard coil 214 and at its upper No. 1 alternate contacts extends a connection from sleeve conductor 202 of the trunk, over the lower contacts of sleeve relay 203, the upper contacts of relay 203, the upper No. 1 alternate contacts of relay 210, over conductor 215 and thence over contacts of the identifier trunk connector to the identifier over which circuit the identifier applies 270-cycle identifying tone current towards the calling line.

Following the association of the identifier with the trunk, the identifier is started to identify the calling line. As soon as the identification of the calling line is completed and the necessary information concerning the identity of the calling office, the numerical digits of the directory number of the calling line and the class of the calling line, have been registered in the identifier, this information is transferred to the sender and results in the setting of register relays therein. One register is set in accordance with the calling office unit in which the calling line is located from the setting of which the three office code digits of the calling line number may be secured and four other registers are set to register the thousands, hundreds, tens and units numerical digits of the calling line number (see Fig. 6).

When all of the digits of the called line number have been transferred to the called office code and numerical registers of the sender a check test is made to determine if the proper number of relays of each register have been operated. When all of the calling line number and class information has been transferred to the sender another check test is made to determine if the proper number of register relays have been operated and if so relay 600 operates and locks in a circuit from battery through its winding over its lower front contacts to ground on an off-normal conductor 601.

Following the registration of the called office code digits in the sender, the sender proceeds to control the completion of the connection of the wanted line in accordance with the office code and numerical digits of the wanted line number. When the last digit of such called line number has been dialed into the sender and when the last series of impulses has been sent from the sender to set a connector upon the terminals of the wanted line, sufficient current is permitted to flow through the windings of relay 210 of the trunk to cause the latter relay to operate in the positive direction to operate its lower contacts. Relay 210 thereupon establishes a circuit over its lower No. 2 front contact for cut-through relay 216 which operates and locks over its lower outer front contact to ground over the upper front contact of relay 206.

At the trunk, relay 216 opens the dialing loop extending from the calling line to the sender and at its upper No. 1 and lower No. 2 front contacts connects the calling line, extended to tip and ring conductors 200 and 201, to the windings of supervisory relay 217. Relay 217 now operates in a circuit which may be traced from the tip trunk conductor 200 over the upper No. 1 contacts of relay 216, conductor 218, through the upper left winding of repeating coil 219 and the upper No. 4 back contact of relay 220 to ground through the upper winding of relay 217 and from the ring conductor 201, over the lower No. 2 front contact of relay 216, conductor 221, through the lower left winding of repeating coil 219 and over the upper No. 3 back contact of relay 220 to battery through the lower winding of relay 217. Relay 217 operates and closes a circuit for holding relay 206 operated which may be traced from battery through the winding of relay 206, over the contacts of relay 217 to ground over the inner lower contacts of relay 206. With relay 216 operated the original locking circuit for relay 206 is opened and relay 206 is now held operated entirely under the control of the calling subscriber to control the holding of the trunk. Relay 216 also establishes a circuit extending to the called line which may be traced in part from the tip conductor of the called line over conductor 222, over contacts (not shown) of relay 216, through the upper right winding of repeating coil 219, the winding of polarized supervisory relay 223, conductor 224, the lower right winding of repeating coil 219, over contacts (not shown) of relay 216, and conductor 225 to the ring conductor of the called line. Relay 223 being polarized does not receive current in the right direction at this time to cause its operation.

*Response of the called subscriber*

When the called subscriber answers, the direction of current flowing through the winding of supervisory relay 223 is reversed whereupon relay 223 operates in turn establishing a circuit from battery through the winding of reversing relay 226 to ground over the front contact of relay 223. Relay 226 upon operating connects ground over its lower No. 2 contacts and the circuit previously traced to the sleeve conductor 202 of the trunk to replace the ground supplied to such circuit over the lower No. 2 back contact of relay 208 after relay 208 operates as will be presently described. As soon following the operation of relay 226 as ground is applied over conductor 227 at the miscellaneous interrupter frame, a circuit is completed over the lower No. 2 normal contacts of relay 228, over conductor 229, the lower No. 1 contacts of relay 216, conductor 230, the lower No. 3 contacts of relay 226 and over the upper No. 3 back contact of relay 208 to battery through the lower winding of relay 228. Relay 228 thereupon operates locking to direct ground over its lower No. 2 alternate contacts and connecting ground over its upper No. 4 contacts and over the upper No. 3 back contact of relay 253 to start conductor 231 extending to the miscellaneous interrupter frame to start the measurement of a time interval. After two seconds delay, ground will be applied to conductor 232 at the interrupter frame thereby completing a circuit over the upper No. 3 contacts of relay 228, through the normal contacts and winding of relay 256 to battery, whereupon relay 256 operates and locks over its alternate contacts, over the upper No. 2 back contact of relay 220 and conductor 233 to ground over the upper normal contacts of relay 211.

*Timing the conversation*

With relay 256 operated a circuit is established from ground over a contact of relay 234, which is operated once every fifteen seconds by the telechron clock-operated timer 235, over conductor 236, conductor 237, the lower No. 4 contacts of relay 256, lower No. 2 back contact of relay 220 and over the upper No. 1 contacts and through the upper winding of relay 228 to hold such relay operated and over the upper No. 2 contacts of relay 228, conductor 238 to battery through the winding of stepping magnet 305 of the units timing register 350. Thus at fifteen-second intervals the brushes of such timing register are advanced step-by-step. If the conversation continues until the register 350 advances its brushes 352, 354 and 356 to the No. 38 terminals of their associated arcs, a circuit will be closed from ground applied to conductor 238, thence as traced through the winding of the stepping magnet 305 of register 350 and also over the upper No. 2 back contact of relay 239, over brush 356 and the No. 38 terminal of its arc, over the lower No. 3 back contact of relay 239 to battery through the winding of stepping magnet 303 of the tens timing register 300. The operation of magnet 303 will advance register 300 one terminal thereby causing register 300 to advance one step for each revolution of register 350. In this manner register 350 is used as a measure of the units of conversation time while register 300 measures the tens. The terminals 38 and 39 on the arcs of the units register 350 are passed by when the tens register 300 has made one step or more. The units register 350 always passes by its No. 22 position terminal by the establishment of a circuit from ground on brush 351, over the No. 22 position terminal of its arc and over the interrupter contacts and through the winding of stepping magnet 305 to battery. The advance of registers 300 and 350 continues in this manner throughout the conversation.

*Operation of sender trunk connector*

After the identifier had transmitted all of the information to the sender required for the completion of the connection, relay 600 was operated as previously described as a signal to the sender to complete the establishment of the connection and that a record should be made. Relay 600 upon operating, locked over its lower front contacts to ground on conductor 601, caused the release of the identifier and established a circuit for relay 602 extending from battery over the upper contacts of relay 600, through the winding of relay 602, over the normal position terminal of the arc of switch 650 with which brush 654 should be engaged if the switch is in its normal position, over the normal contacts of stepping relay 603 to ground on off-normal ground conductor 604. Relay 602 upon operating locks over its lower No. 1 contacts to ground on conductor 604 and establishes a circuit which may be traced from battery through the winding of relay 605, the upper No. 1 contacts of relay 602 to ground applied to conductor 606 from the sender.

Relay 605 upon operating establishes a circuit which may be traced from battery over conductor 607, brush 501 of trunk finder 500, conductor 502, the upper outer contacts of relay 605, conductor 608, of cable 609, allocated to the group of ten ticketing trunks appearing in the tenth vertical group of the banks of trunk finder 500 and in which group the calling trunk is located, through the winding of lock-out relay 700 of the sender trunk connector circuit of Fig. 7, allocated to the first sender assumed to be in use for the connection and to the vertical group of trunks in which the calling trunk is located, thence to ground over the inner upper normal contacts of lock-out relays of all other senders having access to the same group of trunks of the sender trunk connector circuit if not being used by another sender. Relay 700 operates, locks over its upper alternate contacts to ground, establishes an operating circuit for the multicontact connector relay 701, from ground through the winding of such relay, over the inner lower front contact of relay 700, through resistance 702 to battery, and establishes a circuit from battery through resistance 703 over the middle upper front contact of relay 700, conductor 704, brush 503 of trunk finder 500, conductor 705, through the winding of multicontact relay 706 and over conductor 707 to ground over the lower back contact of relay 240. With multicontact relays 701 and 706 now both operated, a plurality of circuit paths is established from the ticketing trunk to the sender for the purpose of transferring registered information from the sender to the recorder 360 of the trunk. Also ground on conductor 711 from the sender trunk connector relay 706 operates relay 307 in Fig. 3 to be explained later in connection with the operation of the recorder 360.

It is to be noted that ten subgroups of ten trunks each of a group of one hundred trunks appear in the vertical rows of terminal sets of the banks of the trunk finders of the group and that each of the sender trunk connector circuits, of which one is disclosed in Fig. 7, serves a group of ten trunks, such connector circuit having a relay such as 701 for each sender and ten relays, such as 706 for the ten trunks of the subgroup which it serves. Nine similar sender trunk connectors would be provided to serve the other nine subgroups of trunks.

With relays 706 and 701 both operated, a circuit is established from ground over the No. 1 contacts of such relays and conductor 708 to the sender which, as a result of this ground condition, effects the operation of relay 629 to complete the circuit at its contacts, from ground over contacts of the now operated off-normal relay 610 through brush 652 of switch 650 and the normal terminal of its associated arc, through the winding and interrupter contacts of stepping magnet 611 to battery. Magnet 611 thereupon operates and releases to advance the brushes of switch 650 one step whereupon the circuit of magnet 611 is opened at brush 652.

*Initiation of recording*

As soon as the sender is connected to the trunk by means of the sender trunk connector circuits of Fig. 7, and the circuit is established for relay 307 as previously traced, relay 307 operates and connects a source 310 of alternating current to the motor 311 of the recorder 360 over the upper and lower front contacts of relay 307. The motor 311 will drive the magnetic tape 313, by means of a gear train 312, past the combination magnetising and pick-up coils 314 as long as the sender trunk connector of Fig. 7 is operated, which will last until the information registered by the sender has been recorded on tape 313.

The coils 314 are at this time connected over the upper and lower inner back contacts of relay 308, upper back contacts or relay 309, upper back contacts of relay 306, over conductors 709 and 710, through the connector relays 706 and 701, over leads 712 and 713, to the front contacts of the multifrequency recording relays at the lower portion of Fig. 6. By means of these relays the information registered on register relays of the sender, such as called line number, calling line number, class of service of the calling line, the number of the sender and identifier employed, etc., may be transferred, as will be explained, to the magnetic tape 313. This information is recorded on tape 313 in the form of combinations of simultaneously superimposed audible frequencies derived from the oscillators of Fig. 8. A digit or numeral is represented on tape 313 by a combination of two superimposed frequencies.

Figure 8:
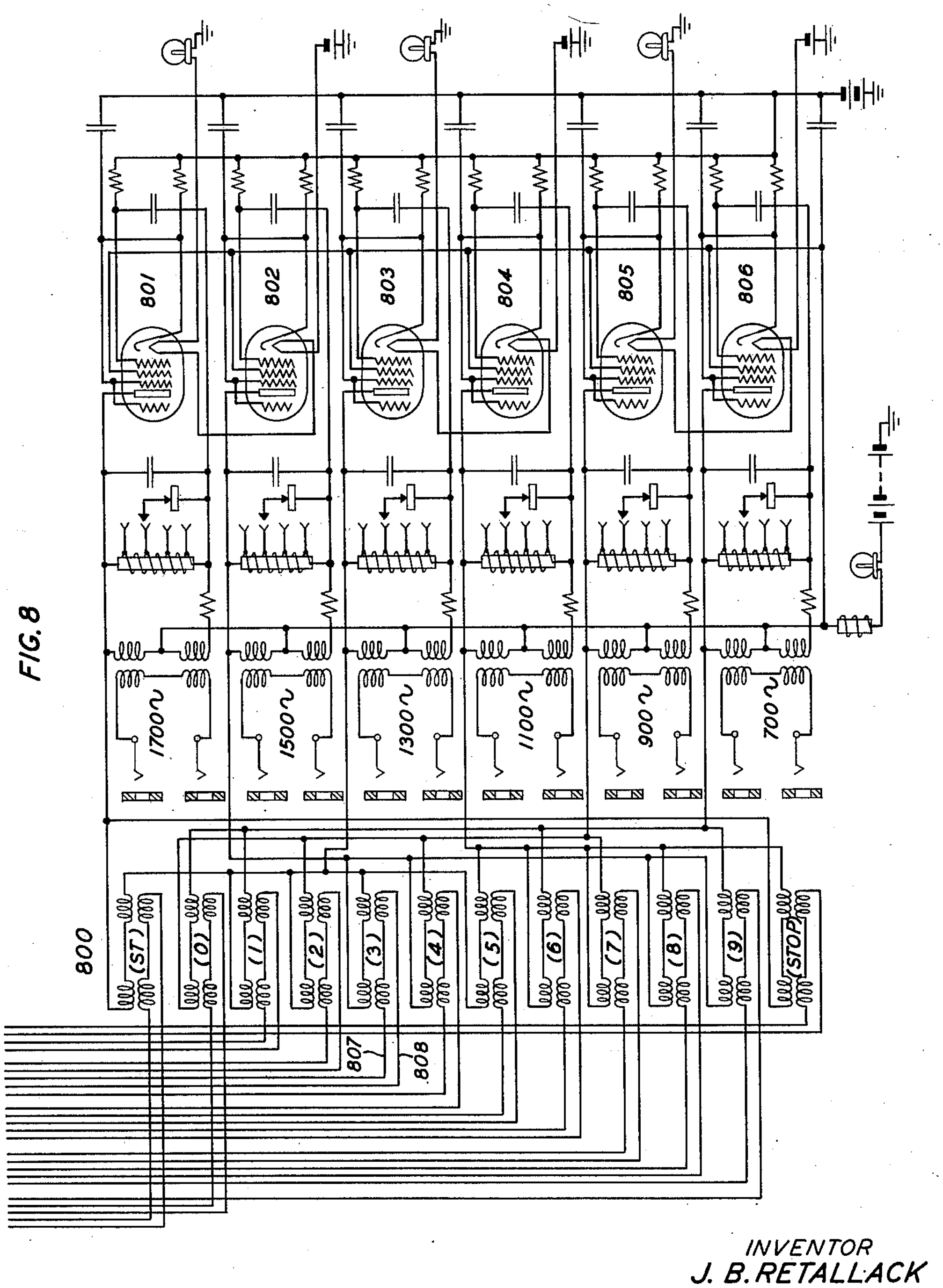
Fig. 8 shows a group of alternating current generators of the vacuum tube type associated with said trunk and usable by a sender seized by said trunk.

The circuit of Fig. 8 is fully disclosed and explained in Patent 2,288,251 to P. B. Murphy of June 30, 1942. It will suffice here to say that, as marked on Fig. 8, oscillator 801 generates a 1700-cycle signal, oscillator 802 a 1500-cycle signal, etc. The transformers 800 combine these frequencies in pairs which represent a start signal, digits and a stop signal. For instance the start signal is composed of frequencies of 1700 cycles and 1300 cycles combined in transformer (ST) and the digit 3, for instance, is composed of frequencies of 1500 and 1300 cycles, these frequencies being combined by transformer (3).

With the brushes 652 and 654 of switch 650 on the No. 2 terminals of their arcs and the magnetic tape recorder control conductors 709 to 711 extended over contacts of relays 706 and 701 of the sender trunk connector circuit, and conductors 712 and 713, respectively, of the sender, a circuit is established from ground on the off-normal ground conductor 604, over the normal contacts of relay 603, brush 654 and the No. 2 terminal of its arc, conductor 612 through the winding of the ST relay to battery and ground. The ST relay operates and connects the secondary of the ST transformer of Fig. 8 through the lower contacts of the ST relay, conductors 712 and 713, through the sender trunk connector switches of Fig. 7, over leads 709 and 710 to the magnetizing coils 314 of the recorder 360 over the upper back contacts of relays 306 and 309 and the upper and lower inner back contacts of relay 308. Thus a start signal composed of a combination of 1700 cycles and 1300 cycles is recorded in the tape 313. When the ST relay operated, an obvious circuit was completed for the interrupter relay 613 over the upper contacts of the ST relay. The armature of relay 613 permits off-normal contacts actuated thereby to connect ground to conductors 614 and 615. With ground connected to conductor 615, the circuit of relay 603 is completed and relay 603 operates, locking over its lower contacts to ground connected to conductor 614; establishing a circuit for stepping magnet 611 which may be traced from ground on conductor 604, over the upper alternate contacts of relay 603 and through the winding of magnet 611 to battery; and opening at its upper normal contacts the previously traced circuit of relay ST. Relay ST thereupon releases in turn releasing relay 613 whereby the locking circuit of relay 603 is opened at the off-normal contacts of relay 613. Relay 603 releases in turn releasing magnet 611 to advance the brushes 652 and 654 of switch 650 to the No. 3 terminals of their arcs. When the brush 654 engages with the No. 3 terminal of its arc ground is supplied from off-normal conductor 604, over brush 654, No. 3 terminal of its arc to conductor 616 to operate relay 613 whereupon brushes 652 and 654 of switch 650 are advanced to the No. 4 terminals of their arcs.

*Recording the calling office code*

It will be assumed that the office in which the calling line is located is designated as ILO-9095 and that in response to the identification of the calling office a relay 617 is operated to register the office designation. The sender now proceeds to record the three office code digits of the directory number of the calling line upon tape 313. For this purpose contacts of the register relay 617 are cross-connected to the terminals disclosed in the central portion of Fig. 6 whose digits values correspond to the code letters of the calling office designation, or connected to the Nos. 4, 5 and 6 terminals of the central portion of Fig. 6.

When brush 654 engages the No. 4 terminal of its arc a circuit is established from ground applied thereover, over conductor 618, the lower contacts of register relay 617, terminal 619 strapped to the No. 4 terminal of Fig. 6 and conductor 620 to battery through the winding of relay 4 of Fig. 6. In the manner previously described for the start (ST) relay of Fig. 6, the frequencies of 1500 and 900 cycles are combined by transformer (4) of Fig. 8 and transmitted to the tape 313 over the lower front contacts of relay 4 of Fig. 6, and switch 650 of the sender is controlled to advance its brushes 652 and 654 to the No. 5 terminals of their arcs.

With brush 654 engaged with the No. 5 terminal of its arc, a circuit is established from ground thereover, over conductor 616 to battery and ground through the winding of relay 613 whereupon, as previously described, switch 650 is controlled to advance its brushes 652 and 654 to the No. 6 terminals of their arcs. With brush 654 on the No. 6 terminal of its arc a circuit is completed from ground on brush 654, over the No. 6 terminal of its arc, over conductor 622, upper inner contacts of relay 617, terminal 623 connected to the No. 5 terminal and conductor 624 to battery and ground through the winding of relay 5 of the multifrequency recording relays of Fig. 6. When relay 5 operates its lower front contacts complete a circuit whereby, as previously described for a similar circuit, the multifrequency signal from transformer (5) of Fig. 8 can be recorded in tape 313.

In a similar manner the third office code digit 6 will be recorded on tape 313 when brush 654 is on its No. 8 terminal.

*Recording the calling line number*

It will be assumed that the calling line numerical number is 9095 and that consequently when brush 654 engages with the No. 10 terminal of its arc, a circuit is established from ground thereover, over conductor 627, the upper contacts of relay 628 and the inner lower contacts of relay 625 of the thousands digit register, conductor 626 strapped to the No. 9 terminal of Fig. 6 to battery and ground through the relay 9 of Fig. 6 to thereby transmit the multifrequency signal representing the digit 9 to the tape 313. In a similar manner the switch 650 is controlled to print the hundreds digit, the tens digit and the units digit as the brush 654 engages the Nos. 12, 14 and 16 position terminals of its arc and applies ground successively to the hundreds, tens and units digit registers similar to the thousands digit register so labeled in Fig. 6. Following the recording of the units digit of the calling line number the brushes of switch 650 of the sender are advanced into engagement with the subsequent terminals of their arcs and in a manner similar to that described will record on tape 313 any desired information registered in the sender.

When brush 653 engages the terminal of its arc following the last one upon which information appeared for recording in the recorder 360, a circuit is established from ground thereover, over conductor 629, over contacts of relays 701 and 706 of the sender-trunk connector, conductor 241 and through the lower winding of relay 240 to battery. Relay 240 thereupon operates and locks from battery through resistance 242, through its upper winding and upper No. 1 contacts, conductor 243, contacts of sender relays not shown, and over conductor 257, the upper No. 4 back contact of relay 208 to ground at the upper No. 5 front contact of relay 256. Relay 240 upon operating opens at its upper No. 2 back contact the previously traced circuit for relay 706 of the sender trunk connector circuit whereupon relay 706 releases and in releasing effects the release of relay 610 at the time that the brush 653 or 654 is on the next terminal of its arc. Relay 610 in releasing removes ground from off-normal conductor 604 and removes ground from the circuit established by the operation of relay 629. Removal of ground from off-normal conductor 604 opens the locking circuit of relay 602. Relay 602 upon releasing establishes a circuit from ground over its lower No. 2 back contact, over the strapped terminals of the arcs of switch 650 associated with brushes 651 and 652, over the interrupter contacts and through the winding of stepping magnet 611 whereby the magnet is intermittently operated to advance the brushes of switch 650 to their normal positions. Relay 602 also releases relay 605 which in turn releases the lock-out relay 709 of the sender trunk connector circuit which in turn releases the multicontact relay 701 thereby restoring the sender trunk connector circuit to its normal condition and thereby opening the circuit of relay 307 to stop motor 311.

The release of relay 610 is accompanied by release of all operated relays of the sender including relay 600 by causing the opening of the conductor 601 in the locking circuit of relay 600. The release of relay 610 causes the initiation of the release of the trunk finder 500. When the trunk finder is restored to normal the circuit of relay 207 of the trunk is opened and relay 207 releases. The release of the trunk finder 500 and of relay 207 permits relay 210 to release to normal from its previously operated condition in which its lower contacts were closed. The release of all operated relays in the sender opens the holding circuit for relay 240 at its upper winding thereby permitting relay 240 to release.

At the end of the conversation, when the calling subscriber restores his receiver to the switchhook, relay 217 of the trunk circuit releases in turn releasing relay 206. The release of relay 206 will remove holding ground from relay 216 and from the sleeve conductor of the trunk applied over its lower front contact, thereby releasing relay 216 and initiating the release of the selector switches which were operated to connect the calling line with the trunk and release of the sleeve relay 203 and relay 204. Relay 206, upon releasing, will also establish a circuit for relay 208 which may be traced from battery through its upper winding, over the lower No. 5 contacts of relay 256, conductor 244, the upper No. 2 back contact of relay 240, conductor 245 to ground over the upper back contact of relay 206. Relay 208 upon operating extends its operating ground over its upper No. 2 front contacts, over conductor 246 through the winding of relay 271 to battery whereupon relay 271 operates to connect ground to sleeve conductor 202 of the ticketing trunk to mark the trunk busy to all selector switches. Relay 208 will remain operated until the completion of the recording of the elapsed conversation time on the record tape. When the called subscriber restores his receiver to the switchhook, relays 223 and 226 will release.

*Recording the elapsed time*

With relay 208 operated in the manner described, it opens the locking circuit for relay 228 at its upper No. 3 back contact allowing relay 228 to release; closes a circuit from ground over its lower No. 2 front contact, conductor 247, the upper back contact of pulse-help relay 248, brush 251 of register 250, over the No. 1 terminal of the arc of register 250, over conductor 249 and to ground through the normal contacts and winding of relay 306 and battery and in parallel through the winding of relay 318 and battery.

Relay 306 operates and locks over its inner lower alternate contacts, and conductor 315 to ground over the lower No. 1 front contacts of relay 208. A circuit is completed for relay 307 over the lower contacts of relay 306 to ground whereupon motor 311 is energized from source 310 over the front contacts of relay 307. Motor 311 will resume its movement of tape 313 preparatory to recording thereon the elapsed time. Relay 306, in operating, furthermore transfers the circuit of the magnetizing coils 314, appearing on its upper armatures, from the conductors 709 and 710 to conductors 316 and 317 and thus the front contacts of the elapsed time relays (STOP, 1, 2, 3, 4, 5, 6, 7, 8, 9, 0) of Fig. 3.

Relay 318 upon operating establishes a circuit from ground over its inner contacts, conductor 261, lower No. 4 contacts of relay 208 and through the winding of pulse help relay 248 to battery and ground. Relay 248 thereupon operates, locks over its inner lower contacts and conductor 202 to ground over the outer contacts of relay 318, establishes the circuit of stepping magnet 253 of switch 250 which extends from battery through the winding of magnet 253, the upper contacts of relay 248 and to ground at the upper No. 5 contacts of relay 256, and at its upper back contact establishes the previously traced circuit of relay 318 which releases and opens both the energizing and the locking circuits for pulse help relay 248. Thereupon relay 248 releases opening the circuit of stepping magnet 253 which releases and advances brush 251 into engagement with the No. 2 terminal of its associated arc.

The operation of relay 208 and the release of relay 228 opens the circuit previously traced over which the telechron timer 235 transmitted impulses at 15-second intervals to the stepping of magnets 305 and 303 of the elapsed time registers 300 and 350. It will be assumed that the elapsed time was such as to leave the brushes of switch 300 on the No. 3 terminals of their arcs and the brushes of switch 350, namely 356, 354 and 352, on the No. 25 terminals of their arcs. This will be the case when the elapsed time has been 30 minutes.

With relay 208 operated and relay 228 released a circuit is completed for relay 239, which circuit may be traced from battery, through the winding of relay 239, over the lower No. 3 back contact of relay 220, lower No. 3 back contact of relay 228, upper No. 4 front contact of relay 208, to ground over the upper No. 5 contacts of relay 256 whereupon relay 239 operates.

Relay 239 in operating further opens the operating circuits of stepping magnet 303 at the lower No. 3 back contact of relay 239 and of stepping magnet 305 at the upper No. 2 and No. 4 back contacts of relay 239.

With switch 250 in the position where its brush 251 is on the No. 2 terminal of the switch, a circuit may be traced for the elapsed time recording relay 3 (Fig. 3) and for the interrupter relay 318 as follows, from ground over the lower No. 2 front contact of relay 208, conductor 247, upper back contact of relay 248, brush 251 of switch 250, No. 2 terminal of switch 250, upper No. 1 front contact of relay 208, conductor 260, lower off-normal contacts of switch 322, brush 301 of switch 300, the No. 3 terminal of the associated bank, through the winding of recording relay 3 and interrupter relay 318 and battery to ground. Recording relay 3 and relay 318 will operate, the former to close over its upper front contacts a circuit for transmitting combined frequencies of 1300 cycles and 1500 cycles from transformer (3) of Fig. 8. This circuit extends from transformer (3) over conductors 807 and 808, over the upper front contacts of recording relay 3 of Fig. 3, over conductors 319 and 320, conductors 317 and 316, upper front contacts of relay 306, upper back contacts of relay 309, upper and lower middle back contacts of relay 308 to magnetizing coils 314. The digit 3 is thereby recorded on tape 313 indicating that the tens digit of the elapsed time is 3.

Relay 318, being slow to operate, completes the operating and holding circuits for relay 248. The operating circuit may be traced from ground and battery through the winding of relay 248, over the lower No. 4 front contacts of relay 208, over conductor 261, to ground over the operated contacts of relay 318. The holding circuit may be traced over the lower inner front contacts of relay 248, over conductor 262, to ground over the operated contacts of relay 318. Relay 248 operates and in doing so opens the operating circuits of recording relay 3 and relay 318 at the upper back contact of relay 248. Recording relay 3 and relay 318 release and in doing so remove the operating and holding ground from the winding of relay 248 which in turn releases. During the operation and release of relay 248 a circuit was closed and opened at the upper front contacts of relay 248 for stepping magnet 253. This circuit may be traced from ground and battery through the winding of magnet 253, over the upper front contacts of relay 248, and upper No. 5 front contact of relay 256 to ground. Magnet 253 in operating and releasing steps the brush 251 of switch 250 to its No. 3 terminal. A circuit is now completed for operating recording relay 6 of the elapsed time register. This circuit extends from ground over the lower No. 2 front contact of relay 208, upper back contacts of relay 248, brush 251 and No. 3 terminal of switch 250, conductor 263, brush 354 of switch 350, No. 25 terminal of its arc, through the winding of recording relay 6 and interrupter relay 318 to battery and ground. As before the operation of the recording relay enables transmission to and recording on tape 313 of the frequencies corresponding to the particular recording relay which is operated, 700 cycles and 1100 cycles, from transformer (6) in this case. The operation of relay 318 again operates relay 248 which in turn operates magnet 253 as before to step switch 250 to the No. 4 terminal of its arc to thereby open the operating circuits of recording relay 6 and interrupter relay 318 as previously explained. Similarly as explained before, a circuit is established over the No. 4 terminal of switch 250 and conductor 264 for the STOP relay of the elapsed time register to record on tape 313 a STOP signal composed of frequencies 1100 cycles and 1700 cycles from transformer STOP of Fig. 8. Relay 318 again effects the stepping of switch 250 to its No. 5 terminal as previously described.

Contact of brush 251 with the No. 5 terminal of switch 250 completes an obvious circuit for relay 211 which operates thereover. Operation of relay 211 removes the ground from its normal contacts thereby releasing relay 256. The release of relay 256 opens at its lower No. 5 front contact the operating circuit of relay 208 which thereupon releases. With relay 208 released the locking circuit of relay 306 is opened at the lower No. 1 front contacts of relay 208 whereupon relay 306 releases. With relay 306 released the operating circuit of motor control relay 307 is opened at the lower contact of relay 306 whereupon relay 307 releases stopping motor 311 from moving tape 313. The release of relay 208 establishes a circuit for release magnet 254 which may be traced from ground, over the lower No. 3 back contact of relay 208, upper contacts of off-normal switch 255 associated with switch 250 and closed when switch 250 was stepped from normal, over conductor 265, upper outer back contact of relay 216, conductor 266, to battery and ground through the winding of release magnet 254. Operation of magnet 254 releases switch 250 to normal whereupon the operating circuit of magnet 254 is opened at off-normal switch 255 to release magnet 254.

The release of relay 208 also opened the operating circuit of relay 239 at the upper No. 4 front contact of relay 208 whereupon relay 239 releases. The restoring circuit for the units timing register 350 is now established from battery through the winding and interrupter contacts of the stepping magnet 305 thereof, over the upper No. 4 back contact of relay 239, conductor 267, the lower No. 1 back contact of relay 256, conductor 268, over the strapped terminals associated with brush 352 and thence over brush 352 to ground to advance all the brushes to the No. 1 terminals of their arcs, in which positions no circuit is effective to further operate magnet 305.

With brush 351 now in engagement with the normal terminal of its arc, a circuit is established from ground thereover, over the lower No. 1 back contact of relay 239, over the upper contacts of off-normal switch 322, since register 300 has been advanced from normal, over conductor 321, the lower No. 3 back contact of relay 256 and conductor 269 to battery through the winding of release magnet 304. Magnet 304 upon operating causes the restoration of brushes 301 and 302 of register 300 to their normal positions, whereupon the off-normal switch 322 is restored to release magnet 304. All of the operated apparatus of the trunk has now been restored to normal. The tape 313 now has recorded thereon all of the information required for billing the call.

*Transmission of recorded information to accounting office*

Prior to the release of relay 211 when switch 250 was restored to normal, a circuit was established for the operation of relay 400 over start conductor 270. This circuit may be traced from ground, over the front contact of relay 211, over start conductor 270 to battery and ground through the winding of relay 400. Relay 400 in operating locks over its right inner front contacts, over the right back contacts of relay 401, over conductor 402 to ground over the lower outer back contact of relay 308. A circuit is completed for relay 403 from ground, over the right outer back contacts of relay 404 and left inner front contacts of relay 400 to battery and ground through the winding of relay 403. Relay 403 in operating sets into motion the necessary stepping mechanism for connecting the recording unit 360 with an idle central accounting office trunk circuit shown diagrammatically in Fig. 4 which trunk circuit has connected thereto an idle register 407 to be used for decoding the frequencies found on tape 313 and operating the necessary equipment in accordance with the decoded information to effect operation of a card punching machine or teletypewriter 408.

Such a register as is disclosed in Patent No. 2,237,742 granted April 8, 1941, to A. A. Lundstrom or in Patent No. 2,332,912 granted October 26, 1943, to G. Hecht et al. or in my copending application Serial No. 772,092 filed concurrently herewith, may be used as the apparatus designated in Fig. 4 as 407 along with amplifier 418. The selection of an idle link circuit such as is shown diagramatically in Fig. 4 is a well-known procedure and involves well-known apparatus. For a more complete disclosure thereof reference may be had to Patent No. 1,780,906, granted November 11, 1930, to W. W. Carpenter and R. E. Hersey.

When the idle trunk circuit has been found the brushes 409, 410, 411 and 412 of the trunk finder 413 will be connected over a link to corresponding brushes of the trunk finder 450. A circuit is then completed for relay 414 from ground over the left front contacts of relay 406, conductor 415, brush 411, conductor 416, left outer back contact of relay 404, right outer front contact of relay 400, to battery and ground through the winding of relay 414. Relay 414 in operating completes the operating circuit of relay 404 from ground, over the left outer front contacts of relay 400, left front contacts of relay 414, to battery and ground through the winding of relay 404. Relay 404 in operating locks to ground over the left outer front contact of relay 400, opens the operating circuit of relay 403 at the right outer back contact of relay 404 thus releasing relay 403, and completes a circuit for relay 309. The circuit of relay 309 may be traced from ground, over the left middle front contacts of relay 404, over conductor 417 to battery and ground through the winding of relay 309, which thereupon operates. Relay 309 in operating transfers the magnetizing coil circuit over its upper front contacts to conductors 323 and 324 which extend over brushes 410 and 409, through amplifier 418 to the register 407. Relay 309 in operating completes a circuit for motor control relay 307 over the lower outer front contact of relay 309 whereupon motor 311 is energized to move tape 313. As soon as tape 313 begins to move a locking ground is applied to the winding of relay 309 over its lower inner front contacts from off-normal switch 325 associated with gear train 312. Thus relays 307 and 309 will remain operated until tape 313 has made at least one complete revolution whereupon this locking circuit will be opened at switch 325.

The magnetizing coils 314 will act as pick-up coils and will transmit the information recorded in tape 313 to the register 407 of the accounting office. If, for any reason, register detects a mistake or other maloperation it will effect the operation of relay 419 to request a retransmission of the information and release the link finder switch 413. The operation of relay 419 applies ground over its contacts, over conductor 420, brush 412, conductor 421 to the winding of relay 401 which thereupon operates. The operation of relay 401 opens at its right contacts the locking circuit of relay 400. The release of relay 400, releases relays 404 and 414. The release of relay 404 opens the operating circuit of relay 309 which nevertheless, in conjunction with relay 307, will remain operated, as previously explained, until tape 313 has made a complete revolution, whereupon relays 307 and 309 both release to normal stopping the energization of motor 311. The operation of relay 401 also applies ground over its left outer front contacts to the cold cathode tube timing circuit 422 which, after a suitable period of time necessary for the line finder 413 to restore to normal and for tape 313 to make a revolution, will enable the operation of relay 423. In the meantime relay 401 was locked operated over its left inner front contacts and to ground over the back contacts of relay 423. When relay 423 operates the locking circuit for relay 401 is opened and relay 401 releases reconditioning the previously mentioned locking circuit for relay 400 over the right back contacts of relay 401 and opening the circuit of the timing tube 422 which in turn releases relay 423. During the interval when relay 423 was operated the operating circuit of relay 400 was reestablished over the front contacts of relay 423 whereupon an idle link is found and the preceding procedure is repeated.

When the register 407 detects the STOP signal on tape 313 relays 405 and 406 are released and the link finder switch 413 is restored to normal. When relay 406 released ground was removed from conductors 415 and 416 to open the locking circuit of relay 414 which thereupon releases. Relay 414 upon releasing establishes a circuit for wipe out relay 308 which circuit extends from ground, over the left outer front contact of relay 400, left outer back contact of relay 414, right inner front contact of relay 404, over conductor 424, to battery and ground through the winding of relay 308. Relay 308 in operating completes a circuit over its lower outer front contacts for relay 307 to start motor 311, and relay 308 is locked up over its lower middle front contacts and off-normal switch 325 to ground until motor 311 has revolved tape 313 at least one complete turn. Relay 308 in operating applies direct current from battery 326 over its upper and lower middle front contacts to the coils 314 to wipe out the signals previously recorded on tape 313.

When relay 308 operated the locking circuit of relay 400 was opened at the lower outer back contact of relay 308. Release of relay 400 effects release of relay 404 as previously described and all relays will be released except relays 307 and 308. When tape 313 has made a complete revolution, during which time all signals thereon have been erased or wiped out by battery 326, the off-normal switch 325 will open to release relays 307 and 308 whereupon all relays and equipment have been returned to normal.

The invention is not intended to be limited to the particular embodiment thereof herein disclosed; consequently, claims are appended which alone define the scope of this invention.

What is claimed is:

1. In an automatic telephone system, a calling line, outgoing trunks, a magnetic recorder included in each of said trunks, means under the control of said calling line for establishing a connection from said line over one of said trunks, means under the control of said connection for registering items of information appertaining to said connection, means under the control of said registering means for transmitting to the recorder said one trunk signals in accordance with the setting of said registering means, registering circuits common to said trunks, means under the control of said one trunk for connecting the recorder of said one trunk to an idle one of said circuits, and means controlled by said one circuit for reproducing said signals recorded in the recorder of said one trunk and for transmitting said signals to said one registering circuit.

2. In an automatic telephone system, a calling line, outgoing trunks, a magnetic recorder included in each of said trunks, means controlled by said calling line for establishing a connection from said line over one of said trunks, means controlled by said connection for registering items of information appertaining to said connection, means under the control of said registering means for transmitting to the recorder of said one trunk signals in accordance with setting of said registering means, registering circuits common to said trunks, means under the control of said one trunk for connecting the recorder of said one trunk to an idle one of said circuits, means controlled by said one circuit for reproducing said signals recorded in the recorder of said one trunk and for transmitting said signals to said one registering circuit, and means under the control of said one circuit for wiping out the record in the recorder of said one trunk following the completion of transmission of said record to said one registering circuit.

3. In an automatic telephone system, a calling line, an outgoing trunk, a magnetic recorder included in said trunk, means controlled by said calling line for establishing a connection from said line over said trunk, means under the control of said connection for registering items of information appertaining to said connection, means under the control of said registering means for transmitting to said recorder alternating-current signals of different combinations of frequencies in accordance with the setting of said registering means, registering circuits common to said trunk, means under the control of said trunk for connecting said recorder with an idle one of said circuits, and means under the control of said one circuit for reproducing said alternating-current signals recorded in said recorder and for transmitting said signals to said one registering circuit.

4. In an automatic telephone system, a calling line, an outgoing trunk, a magnetic recorder included in said trunk, means controlled by said calling line for establishing a connection from said line over said trunk, means controlled by said connection for registering items of information appertaining to said connection, means controlled by said registering means for transmitting to said recorder alternating-current signals of different combinations of frequencies in accordance with the setting of said registering means, registering circuits common to said trunks, means under the control of said trunk for connecting said recorder with an idle one of said circuits, means under the control of said one circuit for reproducing said alternating-current signals recorded in said recorder and for transmitting said signals to said one registering circuit, and means under the control of said one circuit for wiping out the record in said recorder following the completion of transmission of said record to said one registering circuit.

5. In an automatic telephone system, a calling line, outgoing trunks, each trunk having a magnetic recorder included therein, means under the control of said calling line for establishing a connection from said line over an idle one of said trunks, a sender connectable under the control of said connection with said one trunk and having registers for registering items of information appertaining to said connection, means controlled by said sender for transmitting to the recorder of said one trunk alternating-current signals of different combinations of frequencies in accordance with the setting of said registers of said sender, registering circuits common to said trunks, means under the control of said one trunk for connecting the recorder of said one trunk with an idle one of said circuits, and means under the control of said one circuit for reproducing said alternating-current signals recorded in the recorder of said one trunk and for transmitting said signals to said one registering circuit.

6. In an automatic telephone system, a calling line, outgoing trunks, each trunk having a magnetic recorder included therein, means under the control of said calling line for establishing a connection from said line over an idle one of said trunks, a sender connectable under the control of said connection with said one trunk and having registers for registering the digits of a wanted line designation, an identifier connectable under the control of said connection with said sender and having registers for registering the digits of the calling line designation, means under the control of said sender and said identifier for transmitting to the recorder of said one trunk alternating-current signals of different combinations of frequencies in accordance with the setting of said registers of said sender and said identifier, registering circuits common to said trunks, means under the control of said one trunk for connecting the recorder of said one trunk with an idle one of said circuits, and means under the control of said one circuit for reproducing said alternating-current signals recorded in the recorder of said one trunk and for transmitting said signals to said one registering circuit.

7. In an automatic telephone system, a calling line, outgoing trunks, each trunk having a magnetic recorder included therein, means under the control of said calling line for establishing a connection from said line over an idle one of said trunks, a sender connectable under the control of said connection with said one trunk and having registers for registering the digits of a wanted line designation, an identifier connectable under the control of said connection with said sender and having registers for registering the digits of the calling line designation, means under the control of said identifier for registering said digits of said calling line designation in registers of said sender, means under the control of said sender for transmitting to the recorder of said one trunk alternating-current signals of different combinations of frequencies in accordance with the setting of said registers of said sender, registering circuits common to said trunks, means under the control of said one trunk for connecting the recorder of said one trunk with an idle one of said circuits, and means under the control of said one circuit for reproducing said alternating-current signals recorded in the recorder of said one trunk and for transmitting said signals to said one registering circuit.

8. In an automatic telephone system, a calling line, outgoing trunks for extending connections to wanted lines each trunk having a magnetic recorder included therein, means under the control of said calling line for establishing a connection from said calling line to an idle one of said trunks, a sender connectable under the control of said connection with said one trunk and having registers for registering the digits of a wanted line designation and the digits of the calling line designation, said sender adapted to control the establishment of a connection from said one trunk to a wanted line, a register included in said one trunk for registering the elapsed time of a conversation between a calling and a called subscriber, means under the control of said sender for transmitting to the recorder of said one trunk alternating-current signals of different combinations of frequencies in accordance with the setting of said registers of said sender, means under the control of said one trunk for transmitting to the recorder of said one trunk alternating-current signals of different combinations of frequencies in accordance with the setting of said elapsed time register, registering circuits common to said trunks, means under the control of said one trunk for connecting the recorder of said one trunk with an idle one of said circuits, and means under the control of said one circuit for reproducing said alternating-current signals recorded in the recorder of said one trunk and for transmitting said signals to said one registering circuit.

9. In an automatic telephone system, a calling line, outgoing trunks for extending connections to wanted lines, each trunk having a magnetic recorder included therein, means under the control of said calling line for establishing a connection from said calling line to an idle one of said trunks, a sender connectable under the control of said connection with said one trunk and having registers for registering the digits of a wanted line designation, an identifier connectable under the control of said connection with said sender and having registers for registering the digits of the calling line designation, said sender adapted to control the establishment of a connection from said one trunk to a wanted line, a register included in said one trunk for registering the elapsed time of a conversation between a calling and a called subscriber, means under the control of said sender and said identifier for transmitting to the recorder of said one trunk alternating-current signals of different combinations of frequencies in accordance with the setting of said registers of said sender and said identifier, means under the control of said one trunk for transmitting to the recorder of said one trunk alternating-current signals of different combinations of frequencies in accordance with the setting of said elapsed time register, registering circuits common to said trunks, means under the control of said one trunk for connecting the recorder of said one trunk to an idle one of said circuits, and means under the control of said one circuit for reproducing the alternating-current signals recorded in the recorder of said one trunk and for transmitting said signals to said one registering circuit.

10. In an automatic telephone system, a calling line, outgoing trunks for extending connections to wanted lines, each trunk having a magnetic recorder included therein, means under the control of said calling line for establishing a connection from said calling line to an idle one of said trunks, a sender connectable under the control of said connection with said one trunk and having registers for registering the digits of said wanted line designation, an identifier connectable under the control of said connection with said sender and having registers for registering the digits of the calling line designation, means under the control of said identifier for registering said digits of said calling line designation in registers of said sender, said sender adapted to control the establishment of a connection from said one trunk to said wanted line, a register included in said one trunk for registering the elapsed time of a conversation between a calling and a called subscriber, means under the control of said sender for transmitting to the recorder alternating-current signals of different combinations of frequencies in accordance with the setting of said registers of said sender, means under the control of said one trunk for transmitting to the recorder of said one trunk alternating-current signals of different combinations of frequencies in accordance with the setting of said elapsed time register, registering circuits common to said trunks, means under the control of said one trunk for connecting the recorder of said one trunk to an idle one of said circuits, and means under the control of said one circuit for reproducing said alternating-current signals recorded in the recorder of said one trunk and for transmitting said signals to said one registering circuit.

JOHN B. RETALLACK.

REFERENCES CITED

The following references are of record in the file of this patent:

UNITED STATES PATENTS

| Number | Name | Date |
|---|---|---|
| 2,089,309 | Tauschek | Aug. 10, 1937 |
| 2,254,933 | Bryce | Sept. 2, 1941 |
| 2,297,365 | Ostline | Sept. 19, 1942 |
| 2,298,519 | Tillman | Oct. 13, 1942 |
| 2,355,903 | Blount | Aug. 15, 1944 |
| 2,513,112 | Shepherd | June 22, 1950 |